United States Patent Office 3,006,756
Patented Oct. 31, 1961

3,006,756
EXTRACTION OF PRECIOUS METAL COMPOUNDS FROM AN AQUEOUS SOLUTION
Theodor Völker and Herbert Zima, Darmstadt, Germany, assignors to Rohm & Haas G.m.b.H., Darmstadt, Germany
No Drawing. Filed Aug. 20, 1957, Ser. No. 679,132
Claims priority, application Germany Sept. 6, 1956
9 Claims. (Cl. 75—118)

This invention relates to a method of extracting metal salts from aqueous solutions thereof.

It is well known that dissolved compounds can be bound by adsorption to surface-active solid substances and that electrolytes can be separated from aqueous solutions by means of so-called "exchangers." It has also been established that amorphous, black-brown polymerization products of hydrocyanic acid are capable of binding salts of metals having a high normal potential and thereby of separating them from aqueous solutions thereof. While adsorption and exchange may take place, it can safely be assumed that the separation of metal salts by means of such polymeric products is largely the result of covalence, i.e., a linkage of the metal salt occurs by way of a free electron pair clinging to the nitrogen. The separation of metal salts by means of polymeric hydrocyanic acid is described in copending application Serial No. 615,754, filed October 15, 1956.

Efforts to remove metal salts from aqueous solutions thereof by means of polymers having cyano groups in the molecule, i.e., polymers formed by nitriles of unsaturated compounds, showed that they lack the ability exhibited by polymeric hydrocyanic acid of binding metal salts by way of covalent linkages. If, for instance, a mechanically finely divided copolymer of eighty parts acrylonitrile and twenty parts methylmethacrylate, e.g., in the fomr of dust obtained by grinding a block of such copolymer, or a polyacrylonitrile produced in the form of a polycondensate, is allowed to act upon a 0.1 M chlorauric acid solution or a 0.1 M silver nitrate solution, a loose and presumably adsorptive bond is created between the metal salt and the polymer. The same is true of other polymeric nitriles such as polymethacrylic acid nitrile and polyvinylidene cyanide.

It has now been found that the adsorptive power of macromolecular compounds of this type increases astonishingly when the polymers are heated or subjected to an alkaline treatment in solution and then isolated as water-insoluble solid substances. The discoloration which occurs when such compounds are heated indicates an intramolecular conversion. A similar change in color occurs, for example, when polyacrylonitrile is dissolved in dimethyl formamide and treated with a caustic solution. The solution, colorless to faintly yellowish, turns yellow to red-orange, depending on the degree of alkalinity. The processes involved were discussed by MacCartney in "Modern Plastics" for July 1953, page 119 et seq. There is considerable evidence to support the author's hypothesis that a cyclic structure, which may have oxygen or sulfur or both in terminal groups, is formed as illustrated:

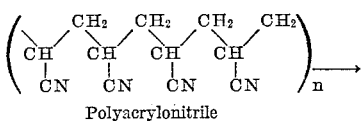
Polyacrylonitrile

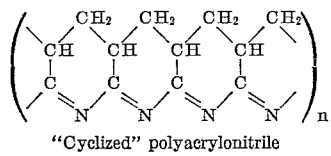
"Cyclized" polyacrylonitrile

The structure of the "cyclized" polyacrylonitrile is distinguished by the presence of C=N double bonds in repeating $C_3NH_3$ units.

It is apparent that the same cyclization occurs when polymers formed by nitriles are heated to temperatures of about 200 to 300° C. Heat treatment of this kind is found to give rise to the same discoloration as the ionic cyclization described; the practically colorless polymer first turns yellow, then brown as the temperature increases and then becomes dark red and, finally, black. It is believed that when polyvinylidene cyanide is subjected to heat treatment, unilateral or bilateral cyclization takes place in the manner indicated below:

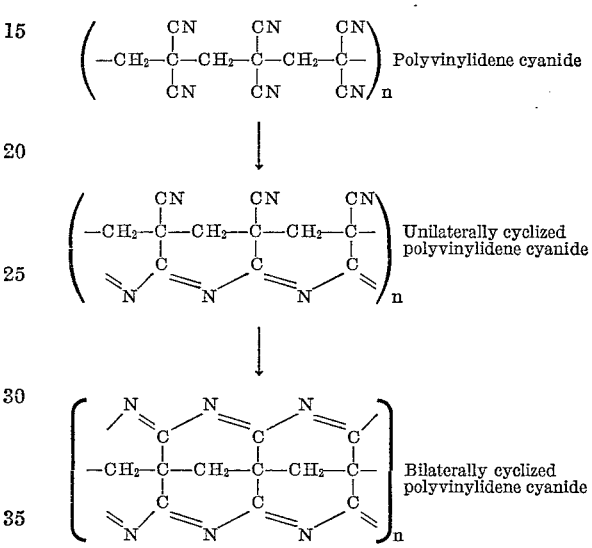

The structures of these cyclized polymers are distinguished by the presence of C=N double bonds in repeating $C_4N_2H_2$ units.

The remarkable improvement in absorbing capacity that is believed to be attributable to the presence of C=N double bonds in the macromolecule is demonstrat by comparative tests of the absorbing capacities of uncyclized and thermally cyclized polyacrylonitrile and polymethacrylonitrile. The test results reported were made with precious metal salts, specifically gold and silver salts. In each test, one gram of polymer was kept in twenty-four hour contact at room temperature with a 0.1 M silver nitrate solution or a 0.1 M chlorauric acid solution. The amounts of metal salts adsorbed, in grams of Ag and Au, were as follows:

| Polymer | Ag Adsorption, g. | Au Adsorption, g. |
|---|---|---|
| Polyacrylonitrile (untreated), fibrous polymer | 0.002 | 0.018 |
| Polyacrylonitrile, heated for 2 hours to 220° C | 0.634 | 0.325 |
| Polymethacrylonitrile (untreated) | 0.029 | |
| Polymethacrylonitrile, heated 2 hours to 195° C | 0.138 | 0.023 |
| Polymethacrylonitrile, heated 2 hours to 250° C | 0.402 | 0.171 |

It has also been found that other macromolecular or higher molecular weight compounds that are insoluble in water and have C=N double bonds have a similar capacity for binding metal salts. This is true not only of cyclic or cyclized compounds but also of products having a ribbon or linear structure. One example of a compound having a ribbon structure that is capable of efficiently binding metal salts is para-cyanogen which, according to the paper by Bircumshaw, Tayler and Whiffen, J. Chem. Soc., 934 (1954), has the structure:

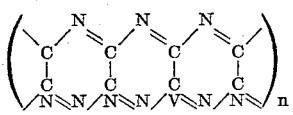

From this, it will become apparent that para-cyanogen also has repeating C=N double bonds. The polyazomethines, also known as polymeric Schiff bases, are examples of polycondensates or high molecular weight compounds having a substantially linear chain structure which, apparently because of their C=N double bonds, also possess the described binding capacity for metal salts in aqueous solutions. These compounds can be prepared, for example, by condensation of dialdehydes with primary diamines. To illustrate, when glyoxal is condensed with hexamethylenediamine, a polycondensate having the following structure results:

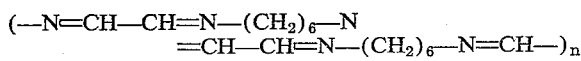

This polycondensate is distinguished by the presence of C=N double bonds in repeating $C_8N_2H_{14}$ units.

The binding capacity of these and other water-insoluble compounds that may contain hetero atoms such as oxygen, sulfur or the like and are characterized generally by the fact that they have C=N double bonds in $C_xN_yH_z$ groups in which $x$, $y$ and $z$ are integers, $x$ and $y$ being at least one and at least two of the integers represented by $x$, $y$ and $z$ being different, will be demonstrated in specific examples to follow.

The method of the invention is particularly applicable to the extraction, from solution, of the salts of metals whose standard electrode potential relative to the electrode potential of hydrogen, as listed in "Lehrbuch der Physikalischen Chemie" by John Eggert (1941), page 545, is more positive than −0.4 volt. Examples of metals that meet these requirements and are capable of being bound are the noble metals such as platinum, palladium, gold and silver as well as others such as copper, mercury and lead.

It has also been found that both the capacity and the rate of extraction of metal salts increase rapidly with increases in the temperature of the metal salt solution at the time of contact. Thus, for example, the amount and rate of metal extraction at 80° C. can be, as demonstrated in the examples, many times the rate and capacity under otherwise similar conditions at ambient temperatures. The temperature of operation is therefore a matter of choice depending upon the economics involved in heating the metal salt solution to be subjected to extraction and the desirability of achieving partial or substantially complete extraction.

One of the advantages of the method of the invention is that it makes possible the extraction of the named metal salts from aqueous solutions whose concentrations are extremely low. It is useful for recovering metals and for removing traces of unwanted metal salts from aqueous solutions. The method also has the advantage of flexibility in providing an economical extraction of metal salts at ambient temperatures or a substantially complete extraction at elevated temperatures.

The advantages and utility of the invention will become further apparent from the following examples included to illustrate the best modes now contemplated of carrying out the invention.

*Example 1*

A vessel was charged, at room temperature or about 20° C., with 50 grams of para-cyanogen prepared by heating mercuric cyanide in a bomb tube to 440° C. and subjected to after-treatment with 2 N nitric acid for removal of any adhering mercury, and with 10 liters of an aqueous solution of chlorauric acid ($AuCl_3 \cdot HCl$) having a gold content of 0.193%. The para-cyanogen settling at the bottom of the vessel was dispersed in the solution by stirring at intervals.

After twenty-four hours, the solution was separated from the para-cyanogen and analyzed as to its gold content. It was found that the 50 grams of para-cyanogen had extracted gold compounds containing 5.80 grams of gold.

*Example 2*

20 grams of para-cyanogen were mixed in the manner described in Example 1 with 10 liters of aqueous chlorauric acid solution, again containing 0.193% gold, the solution being maintained however at a temperature of 80° C. After forty-eight hours, the solution was separated from the para-cyanogen. The solution was found to contain only 0.017% gold, indicating that 20 grams of para-cyanogen had, at the elevated temperature, taken up gold compounds containing 17.6 grams of gold.

*Example 3*

50 grams of para-cyanogen were mixed, under the conditions described in Example 1, with 10 liters of an aqueous silver nitrate solution containing 1.079% silver.

Upon separation from the para-cyanogen after twenty-four hours, the solution was found to contain 0.982% silver, indicating that at room temperature 50 grams of para-cyanogen had extracted silver compounds containing 9.7 grams of silver.

*Example 4*

A representative water-insoluble polyazomethine was prepared by heating 286 grams of 1,6-diaminohexane in 300 cc. of alcohol and then adding thereto, dropwise and with stirring, 160 grams of glyoxal in 200 cc. of alcohol. The mixture was then heated for four hours with refluxing. The reaction mixture was then cooled and mixed with water and an insoluble, amorphous polyazomethine was drawn off. The polyazomethine was purified by repeated extraction with water and finally with boiling methanol. The resulting product was a light brown powder having a nitrogen content of 16.3% and an oxygen content of 3.4%.

50 grams of the polyazomethine so prepared was contacted at room temperature with 10 liters of a 0.1 M silver nitrate solution as described in Example 1. After five hours the solid material was separated from the solution and it was found upon analysis that the 50 grams of polyazomethine had extracted silver compounds containing 20 grams of silver.

*Example 5*

10 grams of the polyazomethine prepared as described in Example 4 were mixed in the manner described in Example 1 with 10 liters of an aqueous chlorauric acid solution containing 0.20% gold. Upon separation of the solid material after twenty-four hours, the solution was found to contain 0.098% gold, indicating that 10 grams of polyazomethine had bound gold compounds containing 10.2 grams of gold.

*Example 6*

50 grams of the polyazomethine prepared as described in Example 4 were contacted with 10 liters of a cupric sulfate solution containing 0.60% copper in the manner described in Example 1. After twenty-four hours, the solution was found to contain 0.495% copper, indicating that copper compounds containing 10.5 grams of copper had been extracted per 50 grams polyazomethine.

*Example 7*

Flocculent, amorphous polyacrylonitrile containing 67.3% carbon, 5.91% hydrogen, 26.50% nitrogen and 0.28% sulfur, was heated for one hour to 220° C. 50 grams of the brown, amorphous product so obtained were contacted, in the manner described in Example 1, with 10 liters of a 0.1 M silver nitrate solution at room temperature. After twenty-four hours, 50 grams of the substance were found to have bound silver compounds containing 31.7 grams Ag.

*Example 8*

50 grams of the heat-treated polyacrylonitrile described in Example 7 were mixed, in the manner described in Example 1, with 10 liters of a solution of chlorauric acid containing 0.20% gold. After twenty-four hours, it was found that gold compounds containing 16.25 grams of gold had been bound to 50 grams of the polymer.

*Example 9*

Two liters of a 3% solution of polyacrylonitrile in dimethyl formamide were mixed with 120 cc. of 1 N caustic soda. After addition of the caustic, the solution turned red. After three hours, 300 cc. of 1 N hydrochloric acid were added, which caused the solution to become yellow. Precipitation was then effected with 6 liters of a 20% sodium chloride solution. A reddish precipitate, containing 24.3% nitrogen and 2.1% oxygen, was siphoned off, rinsed and dried. The actual yield was approximately 100% of the theoretical yield.

50 grams of this substance were mixed, as described in Example 1, with 10 liters of a chlorauric acid solution containing 0.20% gold. After twenty-four hours, gold compounds containing 4.4 grams of gold had been removed from solution.

*Example 10*

100 grams of flocculent polymethacrylonitrile were heated for two hours to 250° C. The resulting product was black and brittle and obtained in 95% yield.

50 grams of this product were contacted, as described in Example 1, with 10 liters of a 0.1 M silver nitrate solution. After twenty-four hours, silver compounds containing 20.6 grams of silver had been removed from solution.

*Example 11*

50 grams of the polymer treated as described in Example 10 were mixed in the manner described in Example 1 with 10 liters of a chloroplatinic acid ($H_2PtCl_6$) solution containing 0.158% platinum. After twenty-four hours, the solution was found to contain 0.0713% platinum. Thus, 50 grams of the polymer had extracted platinum compounds containing 8.67 grams of platinum.

*Example 12*

90 grams of flocculent polymethacrylonitrile were heated for two hours to 300° C. The loss in weight amounted to 27%. The end product was a black, brittle resin. 20 grams of this product were mixed, as described in Example 1, with 10 liters of a chlorauric acid solution containing 0.10% gold. After twenty-four hours, the heat-treated polymer was found to have extracted gold compounds containing 5.0 grams of gold.

*Example 13*

90 grams of chips of a mixed polymer formed of 70% acrylonitrile and 30% methylmethacrylate were heated for two hours to 275° C. The yield was 80%. The product was a black, brittle resin. Ammonia separation occurred upon heating.

50 grams of the polymer so prepared were mixed, as described in Example 1, with 10 liters of a 0.1 M silver nitrate solution. After twenty-four hours, silver compounds containing 2.97 grams of silver were found to have been extracted by the polymer.

*Example 14*

100 grams of a polyacrylonitrile fiber (a mixed polymer formed of 95% acrylonitrile and 5% methylacrylate) were dissolved in dimethyl formamide. The slightly turbid solution so obtained was mixed with 200 cc. of 1 N caustic soda solution. After three hours, 500 cc. of a 1 N hydrochloric acid solution were added and the solution was mixed with an aqueous sodium chloride solution. The precipitated polymer was eluted with water and dried. The end product was a light-brown, amorphous substance. Yield was 70%.

50 grams of this product were mixed, as described in Example 1, with 10 liters of a chlorauric acid solution containing 0.2% gold. After twenty-four hours, 50 grams of the polymer were found to have extracted gold compounds containing 7.80 grams of gold.

It is to be expected that numerous modifications will readily become apparent to those skilled in the art upon reading this description. All such modifications are intended to be included within the scope of the invention as defined in the appended claims.

We claim:

1. Method for extracting a precious metal compound from an aqueous solution of a salt of a precious metal, which comprises bringing the solution into contact with a water-insoluble macromolecular compound selected from the group consisting essentially of para-cyanogen, polyazomethines, cyclized polyacrylonitrile, cyclized polymethacrylonitrile, cyclized polyvinylidene cyanide, cyclized copolymers of acrylonitrile and methylmethacrylate, and cyclized copolymers of acrylonitrile and methylacrylate, and then separating said solution and said macromolecular compound, whereby the content of metal compounds in said aqueous solution is reduced.

2. Method as defined in claim 1 wherein the solution is maintained at an elevated temperature below the boiling point of the solution.

3. Method as defined in claim 1 wherein the solution is brought into contact with para-cyanogen.

4. Method as defined in claim 1 wherein the solution is brought into contact with a polyazomethine.

5. Method as defined in claim 1 wherein the solution is brought into contact with cyclized polyacrylonitrile.

6. Method as defined in claim 1 wherein the solution is brought into contact with cyclized polymethacrylonitrile.

7. Method as defined in claim 1 wherein the solution is brought into contact with cyclized polyvinylidene cyanide.

8. Method as defined in claim 1 wherein the solution is brought into contact with a cyclized copolymer of acrylonitrile and methylmethacrylate.

9. Method as defined in claim 1 wherein the solution is brought into contact with a cyclized copolymer of acrylonitrile and methylacrylate.

References Cited in the file of this patent

UNITED STATES PATENTS

| | | |
|---|---|---|
| 2,304,637 | Hardy | Dec. 8, 1942 |
| 2,539,282 | Spedding et al. | Jan. 23, 1951 |
| 2,726,141 | Appell | Dec. 6, 1955 |
| 2,729,557 | Booth | Jan. 3, 1956 |
| 2,829,045 | Carpenter et al. | Apr. 1, 1958 |

FOREIGN PATENTS

| | | |
|---|---|---|
| 142,890 | Australia | Aug. 14, 1951 |
| 626,081 | Great Britain | July 8, 1949 |
| 785,003 | Great Britain | Oct. 23, 1957 |

OTHER REFERENCES

Hill: "Fibres From Synthetic Polymers," Elsenier Publishing Co., N.Y., 1953, pages 482–5, 530–2.

MacCartney in "Modern Plastics," vol. 30, pp. 119, July 1953.

Tayler et al. in "Journal of Chemical Society," 1954, page 934.